United States Patent [19]

Matsumoto et al.

[11] Patent Number: 4,769,256
[45] Date of Patent: Sep. 6, 1988

[54] METHOD OF CONTINUOUSLY PROCESSING FISH

[75] Inventors: Tadao Matsumoto, Kanagawa; Sunao Inazuma, Tokyo, both of Japan

[73] Assignee: Nippon Suisan Kaisha, Ltd., Tokyo, Japan

[21] Appl. No.: 84,365

[22] Filed: Aug. 12, 1987

Related U.S. Application Data

[62] Division of Ser. No. 845,224, Mar. 27, 1986, Pat. No. 4,708,055.

[30] Foreign Application Priority Data

Apr. 11, 1985 [JP] Japan ................... 60-78039

[51] Int. Cl.⁴ .................. A22C 25/00; A23B 4/06
[52] U.S. Cl. .................... 426/643; 426/393; 426/513
[58] Field of Search ............... 426/643, 513, 519, 524, 426/393; 99/484, 450.2; 425/308, 310, 311, 202, 205, 208, 376 R, 377; 17/32; 366/76, 79; 53/122, 128, 517

[56] References Cited

U.S. PATENT DOCUMENTS 4,464,404 8/1984 Ueno et al. ..................... 426/643
4,494,356 1/1985 Takiguchi ........................ 426/513

OTHER PUBLICATIONS

Food Technology, vol. 38, No. 11, Nov. 1984, pp. 4 and 69-80.

Primary Examiner—George Yeung
Attorney, Agent, or Firm—Sughrue, Mion, Zinn, Macpeak & Seas

[57] ABSTRACT

Method of continuously processing fish and apparatus thereof, by supplying dewatered fish flesh obtained by filleting it or dressing it and thereafter washing, dewatering into a kneader, kneading and incorporating with auxiliary ingredient mixture, which is continuously transported, measured, mixed, and supplied, in predetermined quantities to obtain surimi paste, packing and freezing the resultant surimi product for storage.

1 Claim, 4 Drawing Sheets

METHOD OF CONTINUOUSLY PROCESSING FISH

This is a divisional application of Ser. No. 845,224, filed on Mar. 27, 1986, now U.S. Pat. No. 4,708,055.

BACKGROUND OF THE INVENTION (1) Field of the Invention

This invention relates to a method of continuously processing fish on board by supplying previously processed fish flesh to a kneader and adding auxiliary ingredients during the kneading to obtain surimi which is packed and kept in the frozen storage.

(2) Prior Art

Generally, Alaska pollack or like fish caught in the north ocean or other oceans are quickly collected in a mother ship and processed into surimi therein. The surimi is packed in sacks or vessels. The packages are then frozen, to be stored in the ship, landed and supplied to the market in the frozen state. The fish collected on the mother ship is usually processed in a manner as described in "Frozen Surimi 25-th Anniversary (issued by the Japan Surimi Association, Feb. 16, 1984), p. 233.

The fish collected on the mother ship is first processed by filleting it or dressing it wherein the fish is headed and scaled using a scaler. The fish is then supplied to a flesh separator to make a separated fish flesh. The separated fish flesh is washed with water and then the skin and other undesirable matters are removed to obtain a washed fish flesh, which is then dewatered. The resulting dewatered fish flesh is supplied, in predetermined quantities, to a kneader such as a silent cutter or a mixer in which the dewatered fish flesh is kneaded for a predetermined period of time. During this time, auxiliary ingredients such as sugar are added for such purposes as preventing protein denaturation as described in the Frozen Surimi 25-Anniversary. The surimi is packed in predetermined quantities in sacks or vessels by a packer and frozen storaged. All those processes, such as filleting process, washing process, and dewatering process, are substantially constituted as a continuous process where the materials are supplied and fed continuously. Nevertheless, the process of kneading the dewatered fish flesh by the kneader and adding auxiliary ingredients is a batch process wherein a constant amount of dewatered fish flesh is kneaded for a constant period of time, so that standby times are produced every time a batch of dewatered fish flesh. Particularly, the process of packing the resultant surimi in polyethylene bags or the like has to be a batch process. Therefore, it is difficult to process fish entirely continuously, and high productivity can not be obtained.

In another aspect, auxiliary ingredients such as sugar and sorbitol are added to the dewatered fish flesh in the kneader as noted above. Among such auxiliary ingredients, only sugar can prevent enough the freeze denaturation to a certain extent. If sugar is added too much, however, it makes the meat too sweet and causes discoloring of the meat during frozen storage and heating. For this reason, sugar is partly replaced with sorbitol, that is, a mixture of sugar and sorbitol is added. Further, polyphosphate is added to further improve the water-holding capacity and to increase the effectiveness of protein denaturation.

Thus, sugar, sorbitol and polyphosphate are mixed in predetermined proportions, and this auxiliary ingredient mixture is added in predetermined quantities to the dewatered fish flesh in the kneader. However, the measuring and mixing of the auxiliary ingredients and also the measuring and supplying of the auxiliary ingredient mixture are all done manually and thus requires a great deal of labor. In addition, even if the process of kneading the dewatered fish flesh in the kneader could be made to be performed as a continuous process, the rationalization or productivity improvement of the entire process up to the production of surimi can not be expected unless the process of measuring and mixing the auxiliary ingredients and supplying the auxiliary ingredient mixture are made continuous processes. Particularly, among the auxiliary ingredients sugar and sorbitol have very high water-absorptive property. This adds to the cumbersomeness of the operation described above and also requires more labor. Further, great fluctuations of the proportions, amount, or dispersibility of the mixture are caused, making the quality of surimi instable. Further, since the operation is performed in the ship which is subject to many space limitations, the improvement of the operation of incorporating the auxiliary ingredients has been strongly desired.

In a further aspect, the dewatered fish flesh that is prepared in the mother ship in the manner as described before, is manually measured and charged in predetermined quantities into the kneader, such as a silet cutter, or a mixer. Also, the auxiliary ingredient mixture is manually transported up to the conveyor, and also the level of the auxiliary ingredient mixture to be added is determined by manually measuring the mixture. A considerable number of workers, therefore, are needed for the transportation, measuring and supplying of the auxiliary ingredient mixture, and the labor is heavy physical labor. The operations of mixing sugar, sorbitol, polyphosphate, etc. to prepare the auxiliary ingredient mixture also require very heavy physical labor. Further, if the proportions of the individual auxiliary ingredients incorporated, the dispersibility of the mixture, and the level of the auxiliary ingredient mixture added fluctuate greatly, it gives rise to problems in the stabilization of the quality of surimi and labor-saving and ultimately increases the cost of manufacture.

SUMMARY OF THE INVENTION

The invention seeks to overcome the above drawbacks. More specifically, an object of the invention is to solve the problems in the prior art that the dewatered fish flesh can not be continuously kneaded and the auxiliary ingredient mixture consisting of a plurality of auxiliary ingredients can not be added continuously during the kneading, that is, these processes are inevitably batch processes, that the transportation, measuring, mixing and supplying of the auxiliary ingredients are all based on manual labor, and that the proportions and uniformity of the individual incorporated auxiliary ingredients and the level of the auxiliary ingredient mixture added are liable to fluctuate.

According to the invention, there is provided a method of continuously processing fish by supplying dewatered fish flesh prepared by removing the fish skin, bone and other undesirable matters, washing and then dewatering, to an inlet of a continuous kneader, continuously kneading the supplied dewatered fish flesh in the continuous kneader, adding auxiliary ingredients such as sugar and sorbitol in predetermined quantities during the continuous kneading to obtain surimi paste from an outlet of the continuous kneader, packing the discharged surimi paste in predetermined quantities and freezing the resultant packages in a freezer for storage, which method comprises, a step, prior to continuously supplying the dewatered fish flesh to the inlet of the continuous kneader, of continuously forcing out the dewatered fish flesh toward the inlet of the continuous kneader at constant pressure while effecting dewatering, an extruding step of extruding the surimi paste as a continuouum from the outlet of the continuous kneader, a continuously packing step of continuously packing the discharged continuous surimi paste in predetermined quantities, and a continuously supplying step of continuously supplying the packed surimi to the freezer.

In this method of processing fish according to the invention, the individual auxiliary ingredients such as sugar and sorbitol as the constituents of the auxiliary ingredient mixture are pneumatically transported independently in a cylindrical form and in the presence of accompanying pressurized air between adjacent auxiliary ingredients of cylindrical form, the pressurized air is removed from the pneumatically transported auxiliary ingredients, the auxiliary ingredients alone are then measured, the measured auxiliary ingredients are mixed in predetermined proportions, the resultant auxiliary ingredient mixture is pneumatically transported in a cylindrical form and in the presence of accompanying pressurized air between adjacent auxiliary ingredient mixture of cylindrical form, pressurized air is removed from the pneumatically transported auxiliary ingredient mixture, and the auxiliary ingredient mixture is supplied to the dewatered fish flesh in the continuous kneader, remaining in a predetermined ratio.

DESCRIPTION OF THE PREFERRED EMBODIMENT

Figure 1:
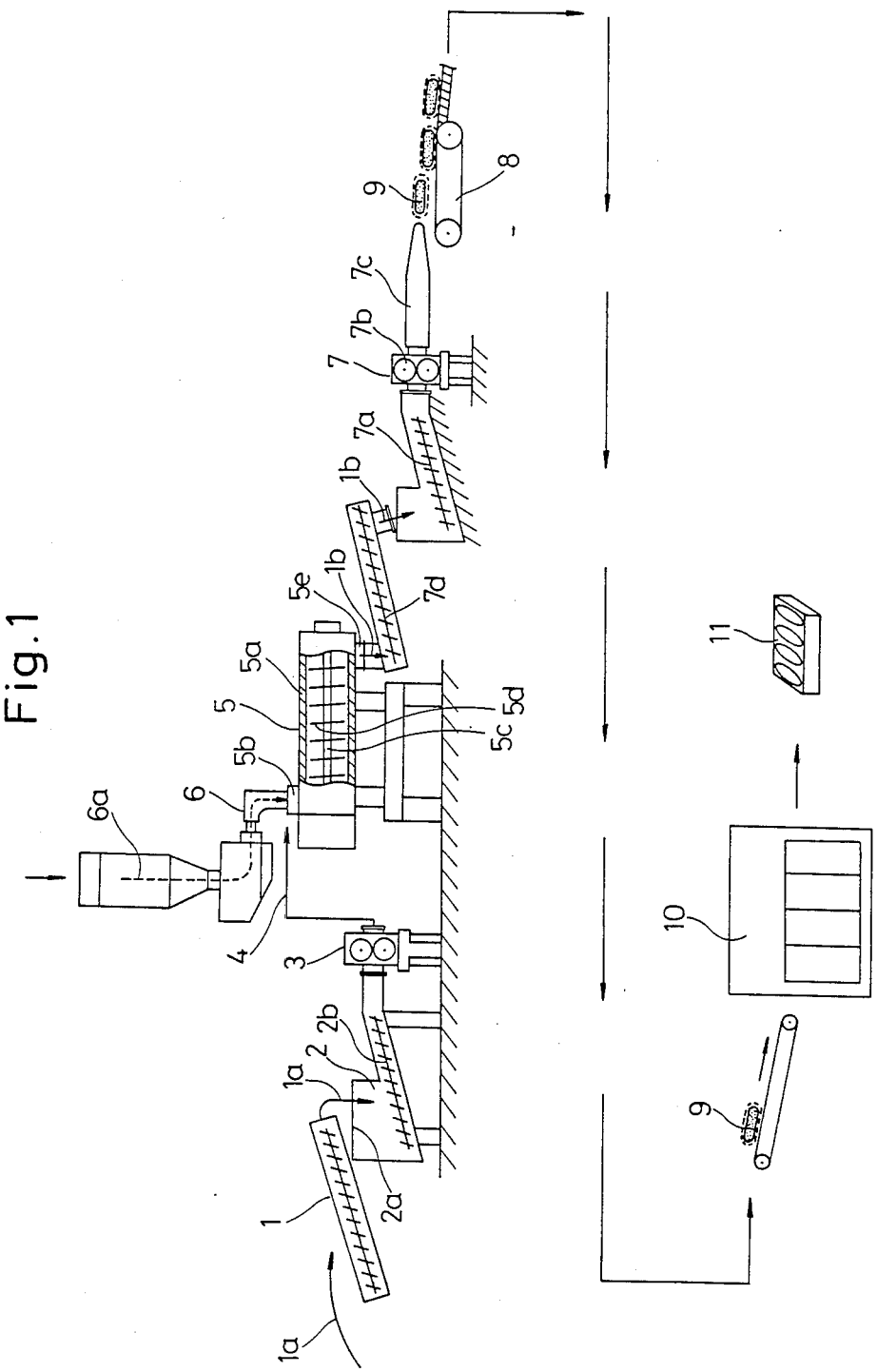
FIG. 1 is a schematic view showing an example of equipment used to continuously knead dewatered fish flesh in a mother ship while adding an auxiliary ingredient mixture during the kneading in accordance with the invention.

Referring to FIG. 1, reference numeral 1 designates screw conveyor. Dewatered fish flesh 1a is charged onto one end of conveyor 1 in the direction of arrow to be supplied to continuous force-out feeder 2. Dewatered fish flesh 1a is prepared in the same manner as in the conventional processes, i.e., by filleting or dressing, separating, washing, and dewatering caught fish. These processes do not constitute an essential element of the invention, so their detailed description is not given.

Dewatered fish flesh 1a consists of the sole meat and is free from undesirable substances such as skin and bone.

Continuous force-out feeder 2 is connected at its rear end 2a to conveyor 1, and dewatered fish flesh 1a is continuously supplied thereto. The supplied fish flesh charged onto continuous force-out feeder 2 is further dewatered and exhausted as it proceeds through the feeder toward the front end thereof and before being introduced into force-out pump 3. Continuous force-out feeder 2, as shown in FIG. 1, has twin screw conveyor 2b. Dewatered fish flesh charged onto rear end 2a of feeder 2 is continuously transported by screw conveyor 2b to force-out pump 3 to be extruded in a pressurized state. Force-out pump 3 consists of an ordinary volumetric pump or the like, and its front end is coupled via connecting tube 4 to continuous kneader 5, which continuously kneads the supplied dewatered fish flesh into surimi paste, and it suitably has a construction as disclosed in Japanese Patent Application No. 100272/1974 filed on Jan. 10, 1974 (Applicant: Nippon Suisan Kaisha Ltd.). More specifically, continuous kneader 5 has housing 5a with inlet 5b by making a notch in it. Two parallel shafts 5c (only one of them being shown in FIG. 1) are accommodated in housing 5a. These shafts 5c carry radially directed cutters 5d mounted on their outer periphery at a predetermined axial pitch. Cutters 5d are mounted such that their edges draw helical lines when two shafts 5c are rotated in opposite directions. With cutters 5d drawing helical lines as two shafts 5c are rotated in opposite directions, the dewatered fish flesh that is continuously supplied from force-out pump 3 through connecting tube 4 is fed forwards just like it is fed by a screw conveyor. During this time, it is kneaded to be discharged continuously as surimi paste from outlet 5e.

In addition to connecting tube 4, chute 6 is coupled to inlet 5b of continuous kneader 5 as shown in FIG. 1. Auxiliary ingredient mixture 6a which has been prepared automatically in a manner as will be described later in detail, is continuously supplied through chute 6. As the dewatered fish flesh is fed through the continuous kneader 5, it is kneaded and mixed uniformly with auxiliary ingredient mixture 6a.

Flesh paste, i.e., surimi 1b discharged from continuous kneader 5 is continuous fed through screw conveyor 7d to continuous extruder 7, which includes force-out feeder 7a like force-out feeder 2, force-out pump 7b and extruding nozzle 7c. Surimi 1b is fed by force-out feeder 7a to force-out pump 7b to be pressurized so that it is extruded as a continuouum from extruding nozzle 7c. The continuouum is discharged onto conveyor 8, and as it proceeds thereon it is devided into blocks having a predetermined quantity. These surimi blocks are continuously packed on conveyor 8. Packages 9 thus obtained are frozen in freezer 10. Frozen product 11 thus obtained is boxed and stored.

Figure 2:
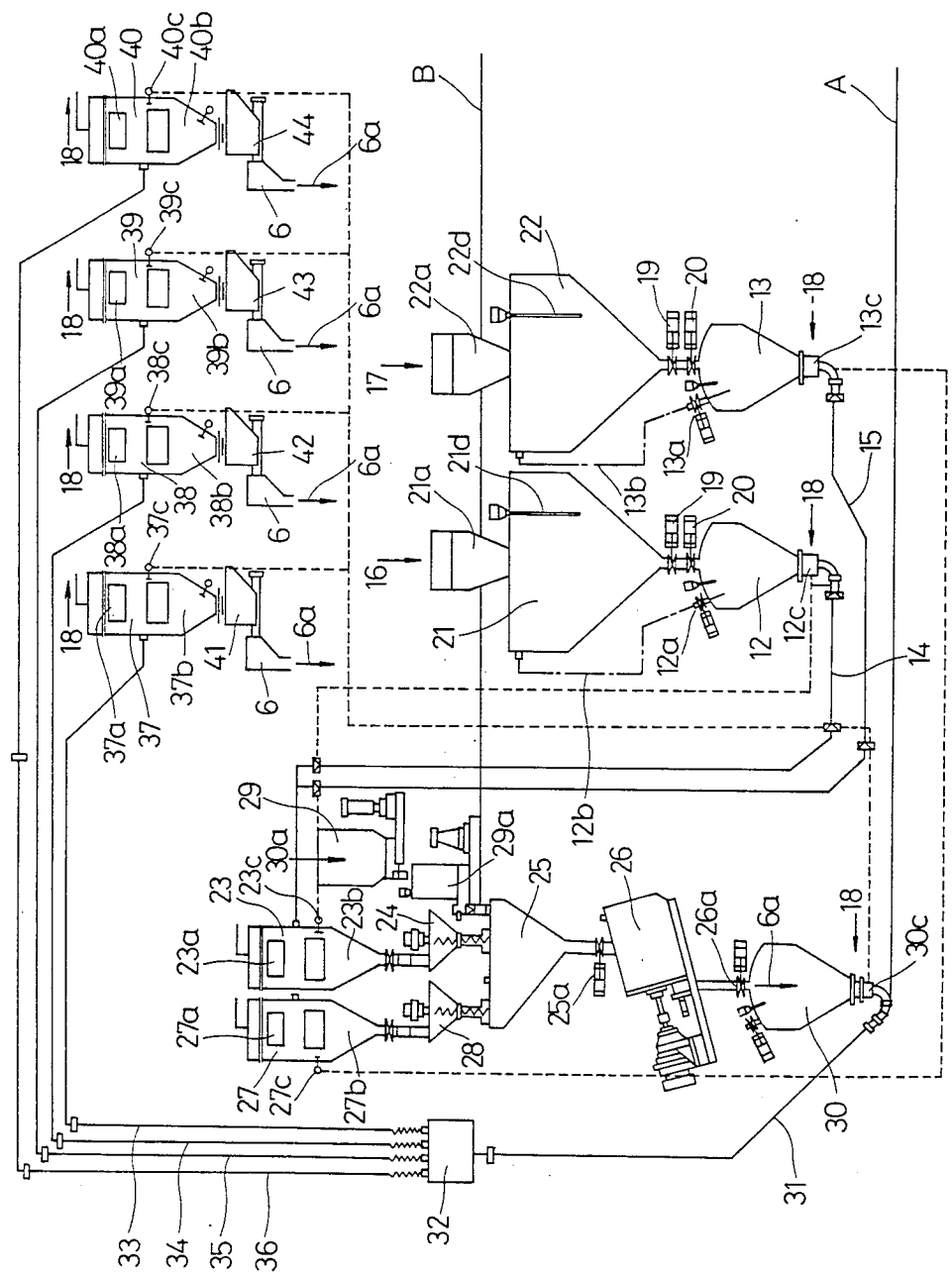
FIG. 2 is a schematic representation of an example of system for automatically supplying the auxiliary ingredient mixture to a continuous kneader in the equipment shown in FIG. 1 for automatically mixing the auxiliary ingredient mixture.

The above continuous processing of caught fish is performed in a mother ship, for instance. During this process, auxiliary ingredient mixture 6a is supplied to continuous kneader 5 through chutes 6 as shown in FIG. 2. The auxiliary ingredient mixture is prepared through automatic mixing of auxiliary ingredients.

Figure 4:
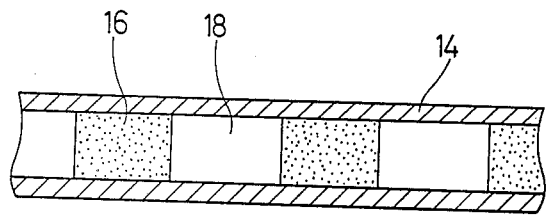
FIG. 4 is a view showing a state in which the auxiliary ingredients are pneumatically transported in the presence of accompanying pressurized air between adjacent auxiliary ingredients of cylindrical form through respective transport lines. (The illustration is showing in the case of transporting of sugar.)

Referring to FIG. 2. reference symbol A designates ship bottom, symbol B floor. Two auxiliary ingredient pressurizing units 12 and 13, for instance, are provided between ship bottom A and floor B. Auxiliary ingredients, e.g., sugar and sorbitol, are supplied independently to charge hopper 23 and 27 by these pressurizing units 12 and 13. Transport lines 14 and 15 are led out from respective pressurizing units 12 and 13. Sugar 16 and sorbitol 17, as auxiliary ingredient, are transported pneumatically through transport lines 14 and 15. As shown in FIG. 4, the auxiliary ingredients are transported in a cylindrical form in the presence of air 18 under high pressure. Pressurizing units 12 and 13 may have any construction so long as the auxiliary ingredient such as sugar 16 or sorbitol 17 is pneumatically transported in the presence of pressurized air. Usually, however, the auxiliary ingredients are pressurized to be discharged through outlets 12c and 13c provided at the bottom of the pressurizing units 12 and 13, while pressurized air 18 is introduced at outlets 12c and 13c to accompany the auxiliary ingredients in the cylindrical form.

Auxiliary ingredient tanks 21 and 22 are connected to the top of pressurizing units 12 and 13 via two valves, i.e., valves 19 and 20. Auxiliary ingredient tanks 21 and 22 have inlets 21a and 22a and also have detectors 21d and 22d, which can detect the surface level of the auxiliary ingredients which are thrown through the inlet 21a and 22a. Pressurizing units 12 and 13 are provided with exhausting valves 12a and 13a which are connected through exhaust ducts 12b and 13b to auxiliary ingredient tanks 21 and 22. Thus, sugar 16 and sorbitol 17 charged through inlets 21a and 22a are pressurized from above in auxiliary ingredient tanks 21 and 22 by exhaust pressure from pressurizing unit 12 and 13. When upper and lower valves 19 and 20 are opened, sugar 16 and sorbitol 17 are smoothly caused to fall into pressurizing units 12 and 17 by using a fall from above.

Pressurized air 18 is intermittently introduced into outers 12c and 13c of pressurizing units 12 and 13. Sugar 16 and sorbitol 17 are discharged intermittently in a pressurized state from outlets 12c and 13c, for instance with switching of charge-over valves. With pressurized air 18 introduced, the auxiliary ingredients are pneumatically transported through transport lines 14 and 15 in the presence of pressurized air 18 as shown in FIG. 4. For example, sugar 16 is pneumatically transported through transport line 14 in the state shown in FIG. 4 up to charge hopper 23. Charge hopper 23 includes filter section 23a and hopper section 23b. Since pressurized air 18 enters together with sugar 16 into hopper 23, it is likely that sugar 16 is partly scattered together with pressurized air 18. When such scattering takes place, pressurized air 18 passes through filter section 23a such as an upper bag filter, so that sugar 16 is recovered in the filter bag. Thus, by vibrating the bag filter, sugar 15 falls into hopper section 23b to be recovered. Meter 24 is connected to a lower portion of charge hopper 23 and measures sugar 16. Sugar 16 thus if fed out in predetermined quantities from meter 24 to cushion tank 25.

Sorbitol 17 to be mixed with sugar 16, like sugar 16, is supplied through transport line 15 to cushion tank 25. More specifically, auxiliary ingredient tank 22 is connected to the top of pressurizing unit 13 via upper and lower valves 19 and 20, and sorbitol 17 is charged into tank 22 through inlet 22a thereof. The cahrged sorbitol in tank 22 falls into pressurizing unit 13 in a state pressurized from above, and pressurized air 18 is introduced at outlet 13c. Thus sorbitol 17, like sugar shown in FIG. 4, is transported in a cylindrical state and in the presence of pressurized air 18 through transport line 15 into charge hopper 27. Charge hopper 27, like charge hopper 23, includes filter section 27a and hopper section 27b. Meter 28 is connected to hopper section 27b, and it is also coupled cushion tank 25. When sorbitol 17 having been transported in the presence of pressurized air 18 enters charge hopper 27, pressurized air 18 is removed, and sole sorbitol 17 enters meter 28 to be measured and fed out in predetermined quantities to cushion tank 25.

Where other auxiliary ingredients than sugar and sorbitol, e.g., polyphosphate, are also supplied to cushion tank 25, similar lines each consisting of an auxiliary ingredient tank, a pressurizing unit, a charge hopper and a meter may be provided for these auxiliary ingredients (not shown in FIG. 2).

Where polyphosphate and other auxiliary ingredients are supplied in small quantities to cushion tank 25, metering unit 29 is provided adjacent to charge hoppers 23 and 27, and polyphosphate 30a and other auxiliary ingredients are supplied in small quantities from outlet 29a of metering unit 29 to cushion tank 25, as shown in FIG. 2.

As shown above, the individual auxiliary ingredients such as sugar, sorbitol and polyphosphate are discharged in predetermined metered quantities to cushion tank 25. When discharge valve 25a of cushion tank 25 is opened, these auxiliary ingredients are transferred from cushion tank 25 to mixer 26 for mixing. Auxiliary ingredient mixture 6a thus obtained is allowed to fall into auxiliary ingredient mixture pressurizing unit 30 by opening discharge valve 26a of mixer 26. Pressurizing unit 30 has the same structure as pressurizing units 12 and 13. While the auxiliary ingredients in pressurizing units 12 and 13 are pneumatically transported independently, auxiliary ingredient mixture 6a in pressurizing unit 30 can be discharged in a cylindrical form from outlet 30c and also transported in the presence of pressurized air 18. It is transported through transport line 31 to switching unit 32, which may select one of a plurality of following transport lines 33 to 36. Through the selected transport line, auxiliary ingredient mixture 6a is fed in predetermined quantities to one of charge hoppers 37 to 40. That is, transport line 31 is connected by switching unit 32 to one of four transport lines 33 to 36, e.g., transport line 33, through which auxiliary ingredient mixture 6a is fed. Charge hoppers 37 to 40 respectively consist of filter sections 37a to 40a and hopper sections 37b to 40b. Auxiliary ingredient mixture 6a is charged in the presence of pressurized air 18 into between filter and hopper sections 37a to 40a and 37b to 40b. Auxiliary ingredient mixture 6a enters along with pressurized air 18 into charge hopper 37 to 40. Where pressurized air 18 is separated from auxiliary ingredient mixture 6a to be discharged to the outside, it is likely that auxiliary ingredient mixture 6a is partly scattered together with pressurized air 18. Pressurized air 18, however again passes through filter sections 37a to 40a, in which auxiliary ingredient mixture 6a is collected. Therefore, auxiliary ingredient mixture 6a can be collected in hopper sections 37b to 40b of charge hoppers 37 to 40 without the possibility of being scattered.

Further, meters 41 to 44 are provided at the outlets of charge hoppers 37 to 40, and auxiliary ingredient mixture 6a is fed in predetermined measured quantities to continuous kneader 5 (FIG. 1). In FIG. 2, chute 6 is shown for each of charge hoppers 37 to 40. These shoots 6 may be coupled to a single continuous kneader as shown in FIG. 1. Alternatively, individual shoots 6 may be coupled to respective continuous kneaders 5 which are connected through continuous extruder 7 to common conveyor pump 8.

For automating the operations of metering sugar, sorbitol and other auxiliary ingredients, mixing these auxiliary ingredient and supplying the mixture to the continuous kneader, charge hoppers 23 and 27 for the independent auxiliary ingredients and charge hoppers 37 to 40 for the auxiliary ingredient mixture are provided with respective level gauges 23c, 27c and 37c to 40c. These level gauges are connected to outlets 12c, 13c and 30c of pressurizing units 12, 13 and 30 which are connected through transport lines to the charge hoppers provided with the level gauges.

More specifically, charge hoppers 23 and 27 for independent auxiliary ingredients such as sugar and sorbitol are provided with level gauges 23c and 27c. Level gauges 23c and 27c are interlocked to outlets 12c and 13c of pressurizing units 12 and 13 which are coupled through transport lines 14 and 15 to charge hoppers 23 and 27. Charge hoppers 37 to 40 for the auxiliary ingredient mixture are provided with level gauges 37c to 40c. These level gauges are interlocked to outlet 30c of pressurizing unit 30 which is coupled through transport lines 31 to 36 to charge hoppers 37 to 40. When the level of sugar in charge hopper 23, for instance, becomes lower than a predetermined level, this is automatically detected by level gauge 23c. Level gauge 23c thus produces an open signal which is coupled through a line shown by dashed line to outlet 12c, so that sugar is supplied from pressurizing unit 12. When the level of sugar in charge hopper 23 exceeds a predetermined level, a close signal is produced to close outlet 12c. When the level of the auxiliary ingredient mixture in one of charge hoppers 37 to 40, for instance charge hopper 37, becomes lower than a predetermined level, this is similarly detected by level gauge 37c. Level gauge 37c thus transmits an open signal to outlet 30c of pressurizing unit 30 for the auxiliary ingredient mixture, while transport line 31 is connected to transport line 33 through switching distributor 32, so that the auxiliary ingredient mixture is fed to charge hopper 37. When the auxiliary ingredient mixture has been supplied up to a predetermined level, outlet 30c is closed by a close signal that is produced at this time, and switching distributor 32 changes the transport line that is connected to transport line 31.

With the arrangement as described above, the transport, metering and mixing of auxiliary ingredients such as sugar and sorbitol and transport of the resultant auxiliary ingredient mixture to the continuous kneader can be entirely automated. In addition, transport lines, through which the auxiliary ingredient mixture is to be transported, can be selected with switching of the switching distributor, and the auxiliary ingredient mixture can be transported to a plurality of different desired places. Thus, all the transport lines 33 to 36 may be used when the catch is large, while only a single transport line, e.g., line 33, may be used when the catch is small. The auxiliary ingredient mixture thus can be quickly supplied to the continuous kneader irrespective of the amount of the catch.

An example will now be given.

EXAMPLE 1

Figure 3:
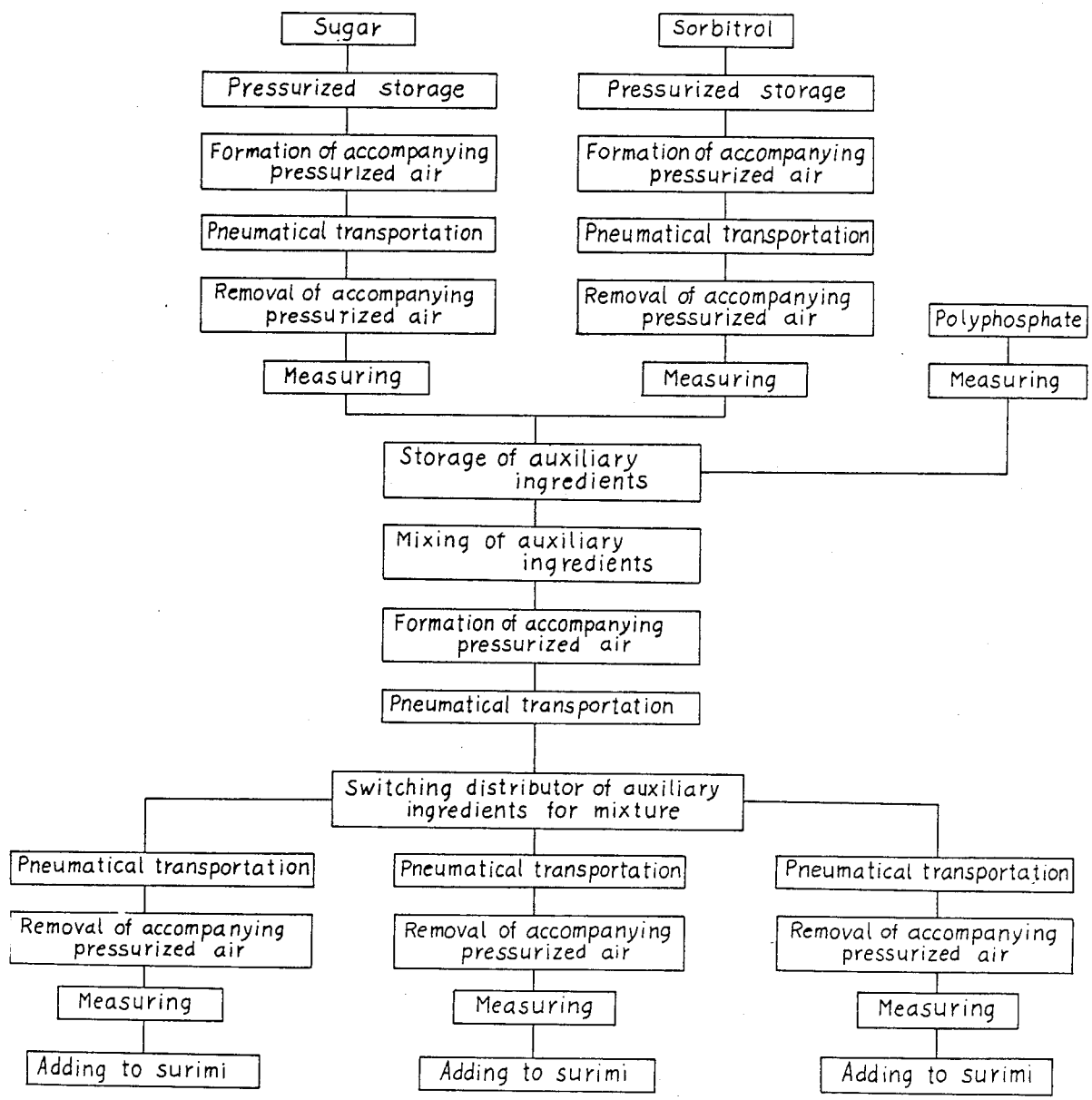
FIG. 3 is a flow sheet showing various processes when sugar, sorbitol and polyphosphate are mixed in predetermined proportions and the resultant auxiliary ingredient mixture is supplied to the continuous kneader using the system shown in FIG. 2.

Fish was processed using the equipment shown in FIGS. 1 and 2. At this time, an auxiliary ingredient mixture prepared from some auxiliary ingredients was added. That is, sugar, sorbitol and polyphosphate are mixed in predetermined proportions using the system shown in FIG. 2, and the resultant auxiliary ingredient mixture is continuously supplied to continuous kneader 5 shown in FIG. 1. The operation concerning this case is shown in the flow chart of FIG. 3.

Of these auxiliary ingredients, sugar was supplied from tank 21 to pressurizing unit 12, and sorbitol was supplied from tank 22 to pressurizing unit 13. The sugar and sorbitol were independently stored in a pressurized state in respective tanks 21 and 22 to be supplied to pressurizing units 12 and 13. When the sugar and sorbitol were discharged from outlets 12c and 13c of pressurizing units 12 and 13, pressurized air 18 was introduced to produce a state, in which individual ingredients 16 and 17 (only individual ingredient 16 is indicated in FIG. 4) were accompanied by pressurized air 18 as shown in FIG. 4. In this state, the sugar and sorbitol were pneumatically transported through transport lines 14 and 15 to charge hoppers 23 and 27. In charge hoppers 23 and 27 accompanying pressurized air 18 was removed, and the sugar and sorbitol were collected in hopper sections 23b and 27b. More specifically, through transport lines 14 and 15 between charge hoppers 23 and 27 and pressurizing units 12 and 13, the sugar 16 and sorbitol 17 were transported not in a state where they were merely suspended in pressurized air but in a state where pressurized air 18 and sugar 16 or sorbitol 17 in the cylindrical form were arranged alternately as shown in FIG. 4. Thus, sugar 16 and sorbitol 17 could be pneumatically transported to charge hoppers 23 and 27 with less amount of pressurized air, that is, the ratio of the amount of sugar 16 and sorbitol 17 to the amount of accompanying pressurized air 18 could be increased. That is, these auxiliary ingredients could be transported in an increased amount with the same amount of pressurized air. Further, the speed of transport could be reduced compared to the case where the auxiliary ingredients are suspended in air. Thus, the ingredients could be transported even with a large transport lift such as from the bottom of the hatch to the deck. This is desired very much for a large mother ship. Further, although sugar and sorbitol have high water-absorptive property, they could be transported irrespective of this property without spoiling their shape and structure.

In individual charge hoppers 23 and 27 the pressurized air was removed. When the sugar and sorbitol were collected in this state, their net weight could be measured because of the absence of accompanying air during their measuring by meters 24 and 28. The sugar, sorbitol and polyphosphate as the auxiliary ingredients were temporarily held in cushion tank 25 and then mixed in mixer 26. In this way, these ingredients could be mixed in accurate proportions to obtain auxiliary ingredient mixture 6a which has homogenious in structure. At this time, polyphosphate 30a was metered by metering unit 29 for supplying it to mixing tank 25.

Auxiliary ingredient mixture 6a thus prepared was supplied to pressurizing unit 30, and it was discharged in a pressurized state from outlet 30c of pressurizing unit 30 intermittently through charge-over valve. At this time, pressurized air 18 was introduced so that the auxiliary ingredient mixture was discharged in a cylindrical form and in the presence of accompanying pressurized air 18 from outlet 30c. Transport line 33 was selected among four transport lines 33 to 36 by switching distributor 32, and the auxiliary ingredient mixture 6a was pneumatically transported in the presence of pressurized air 31 through transport lines 31 and 33 to charge hopper 37. In FIG. 4 only sugar is shown as auxiliary ingredients pneumatically transported, but the auxilialy ingredient mixture 6a is also transported in the same manner as shown in FIG. 4. In charge hopper 37 the accompanying pressurized air 18 was removed, and sole auxiliary ingredient mixture 6a was measured by meter 41 to be continuously supplied in a constant ratio through chute 6 to continuous kneader 5.

In continuous kneader 5, dewatered fish flesh 1a was kneaded with the auxiliary ingredient mixture into flesh paste, i.e., surimi 1b.

More specifically, Alaska pollack collected on the mother ship was processed by dressing it wherein it headed and gutted, and then scaled in a scaler. The fish was fed to a flesh separator in which the fish was separated the skin, bone, and remaining guts, thereby obtaining the separated fish flesh. The separated fish flesh was washed with water, and then skin and undesirable matters further remaining in the separated fish flesh was removed by a refiner to obtain refined separated fish flesh which was then dewatered. The dewatered fish flesh 1a was forced onto screw conveyor 1 as shown in FIG. 1 to be continuously fed on screw conveyor 1 to rear end 2a of force-out feeder 2. As the fish flesh was fed through the force-out feeder 2, it was further dewatered and exhausted. The resultant dwatered fish flesh was continuously supplied through force-out pump 3 and connecting tube 4 to continuous kneader 5. To continuous kneader 5 auxiliary ingredient mixture 6a was continuously supplied through shoot 6 as described above, and as the dewatered fish flesh was fed through continuous kneader 5, it was kneaded by cutters 5d and uniformly incorporated with the auxiliary ingredient mixture.

Surimi paste 1b which was continuously discharged from continuous kneader 5 was forced out by force-out pump 7b in continuous extruder 7 from extruding nozzle 7c as a continuum onto conveyor 8. The continuous body was cut into surimi pieces each having a predetermined quantity, which was then packed. Package 9 were frozen in freezer 10, and in the frozen state they were boxed to obtain product 11 which was stored.

Table 1 shows an illustration of decrease of weight fluctuation between improved surimi produced in accordance with the invention as noted above and conventional surimi produced in a manner in which fish is processed in batch processes.

TABLE 1

| Mean Value (Kg) | | Standard Deviation (g) | | Accuracy | |
| --- | --- | --- | --- | --- | --- |
| the present invention | convention | the present invention | convention | the present invention | convention |
| 10.233 | 10.180 | 371 | 34 | 3.6 | 0.3 |

TABLE 1-continued

| Mean Value (Kg) | | Standard Deviation (g) | | Accuracy | |
| --- | --- | --- | --- | --- | --- |
| the present invention | convention | the present invention | convention | the present invention | convention |
| 10.262 | 10.177 | 267 | 42 | 2.6 | 0.4 |
| 10.210 | 10.148 | 177 | 37 | 1.7 | 0.4 |
| 10.277 | 10.155 | 262 | 30 | 2.4 | 0.3 |
| 10.267 | 10.130 | 251 | 30 | 2.4 | 0.3 |
| 10.234 | 10.130 | 255 | 48 | 2.5 | 0.5 |

What is claimed is:

1. A method of continuously processing fish by supplying dewatered fish flesh obtained by removing the skin, bone, and other undesirable matters from fish and dewatering thereof to an inlet of a continuous kneader, continuously kneading the supplied dewatered fish flesh in said continuous kneader, adding a mixture of auxiliary ingredients including sugar and sorbitol in predetermined quantities during the continuous kneading to obtain surimi paste, discharging the surimi paste from an outlet of said continuous kneader, packing the discharged surimi paste in predetermined quantities to form packages of surimi paste and freezing the resultant packages in a freezer for storage, characterized in that said method comprising the steps of;

continuously forcing out said fish flesh by means of a force-out feeder toward the inlet of said continuous kneader whereby the fish flesh is further dewatered and exhausted while it is forced out, and then continuously supplying the dewatered fish flesh to the inlet of said continuous kneader;

pneumatically transporting said auxiliary ingredients independently in a cylindrical form and in the presence of accompanying pressurized air between adjacent auxiliary ingredients of cylindrical form;

removing said accompanying pressurized air from said individual auxiliary ingredients whereby only auxiliary ingredients are measured;

mixing said auxiliary ingredients in accurate proportions on the basis of said measuring to obtain an auxiliary ingredient mixture;

pneumatically transporting said auxiliary ingredient mixture in the cylindrical form and in the presence of accompanying pressurized air between adjacent auxiliary ingredient mixture of cylindrical form;

removing said accompanying pressurized air from said auxiliary ingredient mixture, whereby only auxiliary ingredient mixture is continuously introduced into said dewatered fish flesh in a constant ratio in said continuous kneader;

extruding said surimi paste as a continuum from the outlet of said continuous kneader;

cutting the continuum into surimi pieces each having a predetermined quantity;

continuously packing said surimi pieces to form packages of surimi paste; and continuously supplying packages of surimi paste to said freezer.

* * * * *